July 4, 1933. M. C. BERSTED 1,916,553
FAUCET
Filed May 23, 1929 3 Sheets-Sheet 2
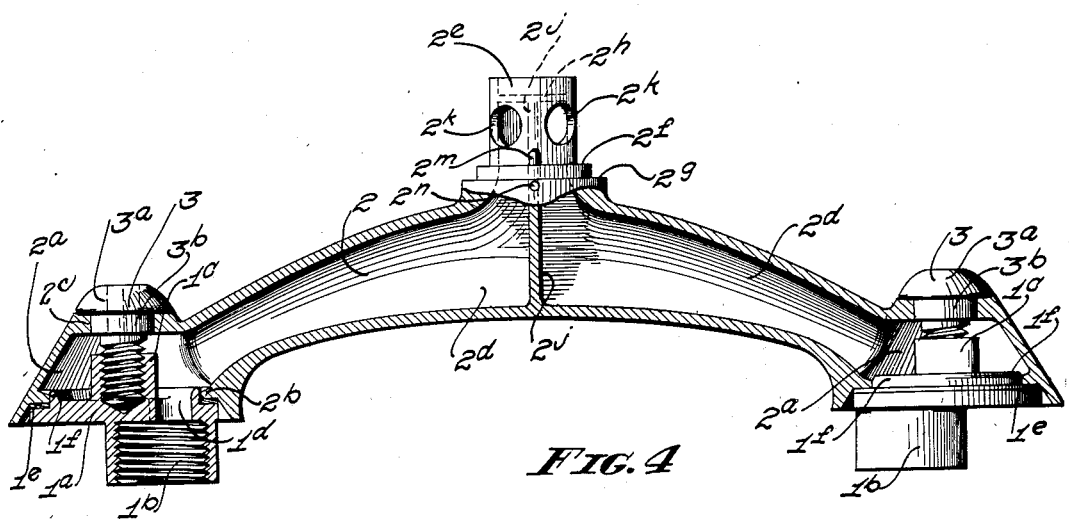
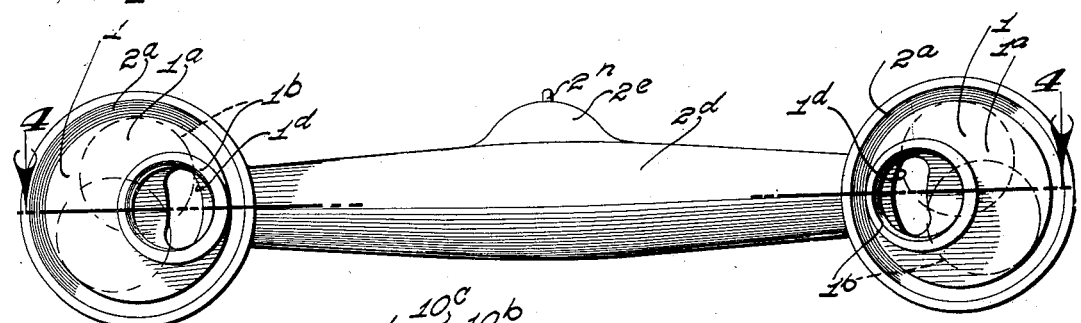
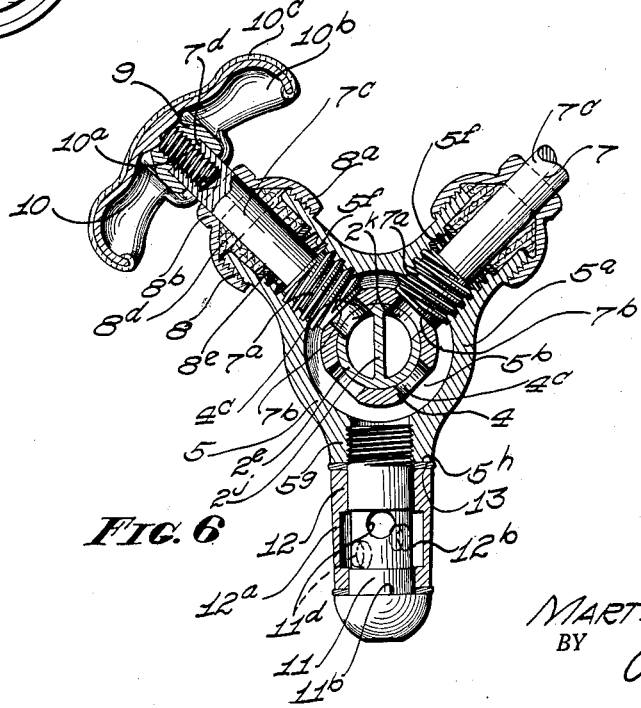
INVENTOR.
MARTIN C. BERSTED
BY
A.B.Bowman
ATTORNEY July 4, 1933.                M. C. BERSTED                1,916,553
                               FAUCET
                          Filed May 23, 1929          3 Sheets-Sheet 3

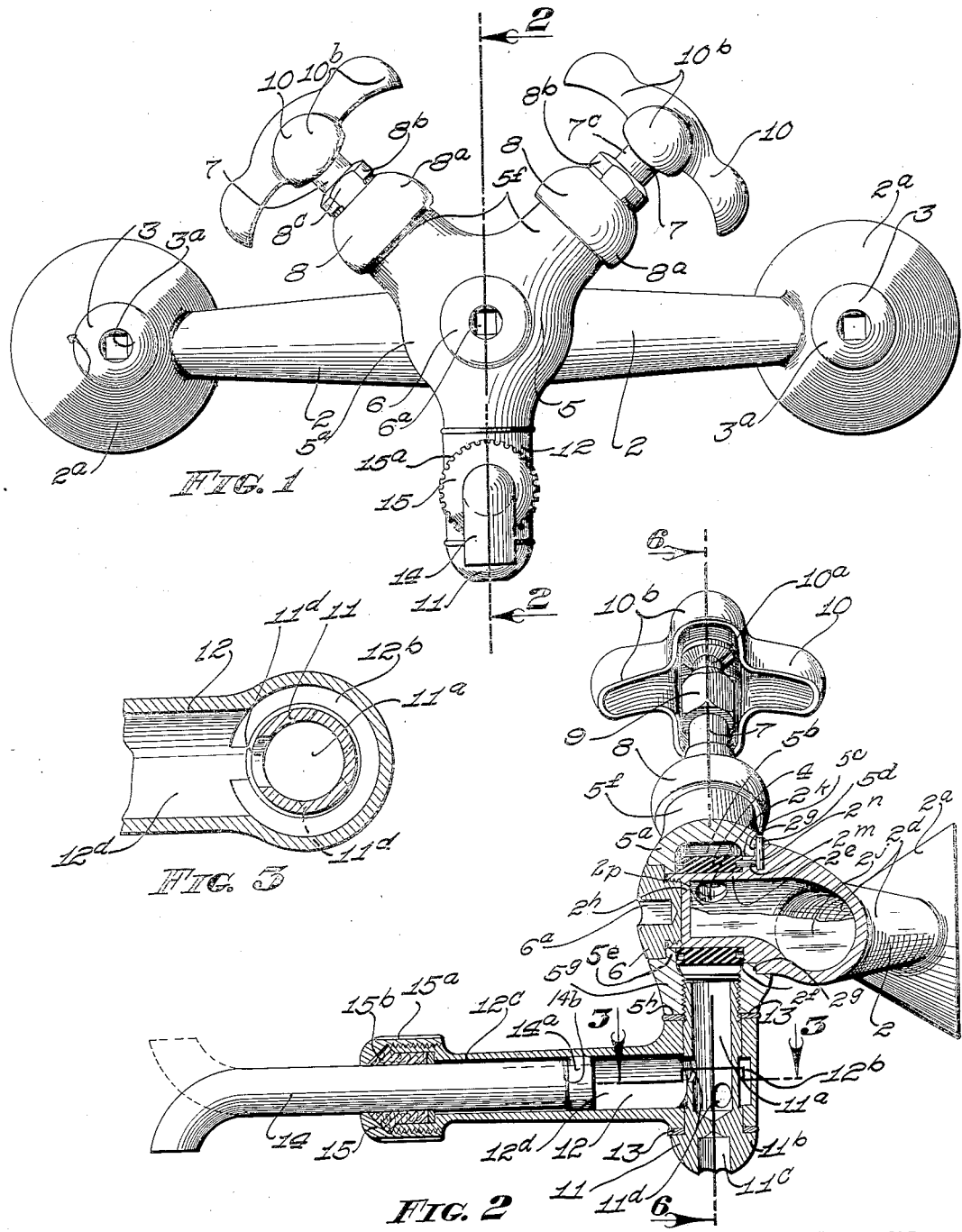

INVENTOR.
MARTIN C. BERSTED
BY
A.B.Bowman
ATTORNEY

Patented July 4, 1933

1,916,553

UNITED STATES PATENT OFFICE

MARTIN C. BERSTED, OF SAN DIEGO, CALIFORNIA

FAUCET

Application filed May 23, 1929. Serial No. 365,314.

My invention relates to faucets, particularly faucets adapted to discharge both hot and cold water, and the objects of my invention are: First, to provide a faucet having a valve body comprising a plurality of valve seats, some of which are auxiliary and readily interchangeable with the valve seats in use; second, to provide a faucet which may be readily installed without marring; third, to provide a faucet which may be readily connected with the plumbing system, so as to be positioned in proper relation to the sink or the like, even though the terminals of the plumbing are not in the proper location; fourth, to provide a faucet in which the spout may be pivoted and extended; fifth, to provide a faucet in which the spout may be turned so as to direct the water upwardly and form a drinking fountain if desired; sixth, to provide a novel faucet handle; seventh, to provide a faucet in which the several joints cannot readily leak and in such event may be readily adjusted so as to prevent leakage; eighth, to provide a faucet which may be readily kept clean and sanitary; ninth, to provide on the whole a novelly constructed faucet; and, tenth, to provide a faucet which is simple of construction proportional to its function, durable and exact in its action, and which will not readily deteriorate or get out of order.

Figure 7:
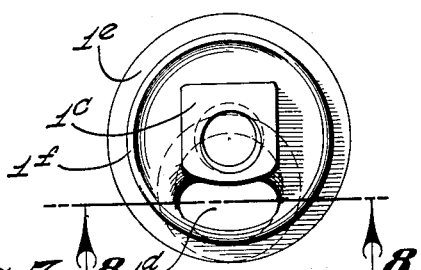
Figure 9:
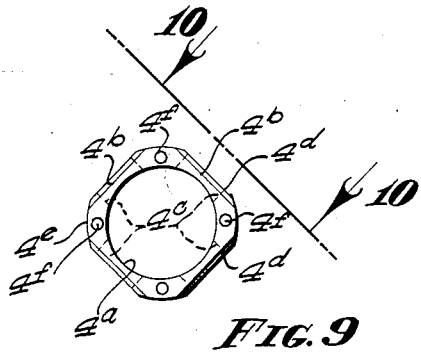
Figure 8:
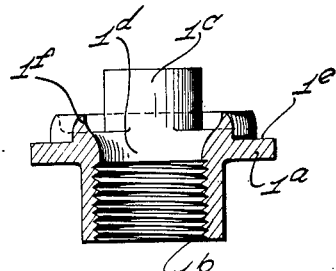
Figure 10:
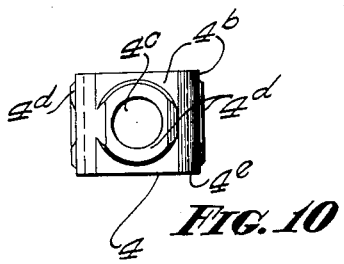
Figure 11:
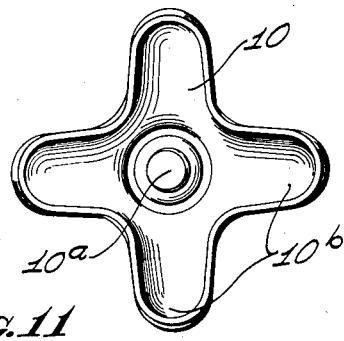
Figure 12:
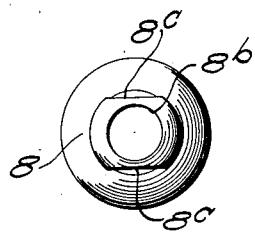

With these and other objects in view as will appear hereinafter, my invention consists of certain novel features of construction, combination and arrangements of parts and portions as will be hereinafter described in detail and particularly set forth in the appended claims, reference being had to the accompanying drawings and to the characters of reference thereon which form a part of this application in which:

Figure 1 is a front elevational view of my faucet; Fig. 2 is a transverse sectional view thereof through 2—2 of Fig. 1, with parts and portions shown in elevation to facilitate the illustration; Fig. 3 is an enlarged fragmentary sectional view through 3—3 of Fig. 2; Fig. 4 is a sectional view through 4—4 of Fig. 5, with parts and portions removed and parts and portions shown in elevation to facilitate the illustration; Fig. 5 is a rear elevational view of my faucet; Fig. 6 is a fragmentary sectional view thereof through 6—6 of Fig. 2 with parts and portions as shown in elevation to facilitate the illustration; Fig. 7 is a front elevational view of one of the couplings; Fig. 8 is a sectional view thereof through 8—8 of Fig. 7; Fig. 9 is an end elevational view of the valve body; Fig. 10 is a side elevational view thereof from 10—10 of Fig. 9; Fig. 11 is an under-side view of one of the valve handles and Fig. 12 is a top or plan view of a valve stuffing box.

Similar characters of reference refer to similar parts and portions throughout the several views of the drawings.

Couplings 1, conductor member 2, screw members 3, valve body 4, valve housing 5, screw member 6, valves 7, stuffing boxes 8, coupling nuts 9, valve handles 10, hollow spindle 11, spout supporting arm 12, gaskets 13, spout 14, and stuffing box 15, constitute the principal parts and portions of my faucet.

Two coupling members 1 are provided. The one coupling is adapted to be secured to the cold water terminal of a plumbing system; the other coupling is adapted to be secured to the hot water terminal thereof. Each coupling comprises a disc portion 1a, having an integral eccentrically located internally threaded cylindrical portion 1b which connects with the end of a pipe. A boss portion 1c integral with and arranged concentrically with the base portion 1a, extends from the opposite side thereof as shown in Figs. 4, 7 and 8. An opening 1d pierces the disc 1a at one side of the boss 1c and intersects the cylinder 1b.

The marginal portion of the disc 1a on the side having the boss portion 1c forms a seat portion 1e. Each coupling member 1 is adapted to fit in a hollow conical end 2a of a conductor member 2. Each end portion 2a is opened at its largest side which forms the rear side thereof. Located near the larger or rear side of the conical portion 2a is an annular inwardly extending flange 2b which is adapted to register with the marginal portion 1e of the coupling 1, so that a fluid tight joint may be made therewith. To facilitate the alinement of the coupling member 1 with the flange 2b, the coupling member 1 is provided with an annular wall portion 1f adjacent to its seat portion 1e, which is adapted to fit within the periphery of the flange portion 1b. If desired, a gasket may be provided between the seat portion 1e and the flange 2b, or any other suitable seating means may be used.

The forward or smaller side of the conical portion 2a is truncated at right angles to its axis, and is closed except for a bore 2c therethrough. A screw member 3 having a head 3a adapted to form a continuation of the outer surface of the conical portion 2a is adapted to extend into the bore 2c. The screw member is provided with an enlarged shank portion at 3b which forms a snug fit with the bore 2c. The remaining portion of the screw shank is reduced in size and threaded so as to fit into an internally threaded socket extending into the boss portion 1c, as shown best in Fig. 4. The head 3a of the screw is provided with a polygonal-shaped socket therein for receiving a suitable tool. The screw 3 draws the coupling 1 tightly against the flange 2b so as to form a fluid tight joint therewith.

The two hollow conical portions 2a are connected together by a yoke portion 2d. The yoke 2d is hollow, substantially circular in cross-section, and increases in diameter towards its central portion. The yoke also curves forwardly towards its central portion. At the forward side of the central portion of the yoke member 2d is a forwardly extending hollow projection 2e having a bore 2p which communicates with the interior of said yoke portion 2d. The projection 2e is enlarged at its juncture with the yoke 2d forming two shoulders 2f and 2g. The bore 2p of the projection 2e is provided with a transversely extending partition 2h near its extended end. A second partition 2j extends rearwardly from the partition 2h, bisecting bore 2p and passage within the yoke 2d, as shown best in Figs. 2, 4 and 6. The projection 2e is provided with two openings 2k therein, one on each side of the partition 2j, and both on the rear side of the partition 2h. The openings 2k extend at ninety degrees with each other, and at forty-five degrees with the partition 2j, which is preferably arranged in vertical position.

The projection 2e forms a support for a valve body 4. The valve body 4 is provided with a bore 4a therethrough adapted to fit snugly around the projection 2e. Either end of the valve body is adapted to abut against the shoulder 2f. The valve body is provided with four flat sides, 4b, arranged at right angles to each other as shown best in Figs. 9 and 10. Each flat side 4b is pierced with a hole 4c. Any two of these holes 4c are adapted to register with the openings 2k, as shown in Fig. 6. The outer face of the valve body around each hole 4c is raised forming a valve seat 4d, as shown best in Fig. 10. The flat sides 4b are connected by arcuate portions 4e adapted to extend flush with the outer periphery of the shoulder 2f as shown best in Fig. 2. Each end of the valve body is provided with a plurality of small sockets 4f, one opposite each curved portion 4e. Any one of these sockets 4f is adapted to fit over a pin 2m extending from the shoulder 2f. The pin 2m and socket 4f facilitate the alining of the various holes 4c and their valve seats 4d with the openings 2k.

A valve housing 5 is adapted to fit over the valve body 4 and projection or valve body support 2e. The central portion 5a of the valve housing is substantially bulbular and forms an annular chamber 5b around the valve body 4, as shown best in Figs. 2 and 6.

Extending into the annular chamber 5b from the rear side of the bulbular portion 5a is an annular opening. An internally extending flange 5c which borders the chamber 5b is provided in this opening and is adapted to rest against the shoulder 2g as shown best in Fig. 2. The remaining portion of the opening extending into the rear side of the chamber 5b extends past the shoulder 2g and is provided with a notch 5d therein at its upper side, which is adapted to register with a pin 2n, extending upwardly from the yoke 2d adjacent to the shoulder 2g thereof. The pin 2n and the notch 5d facilitate the positioning of the valve housing 5.

The forward side of the bulbular portion 5a of the valve housing is provided with an opening which intersects the forward side of the chamber 5b therein. This opening is also provided with an internally extending flange 5e, which borders on the forward side of the chamber 5b, fits snugly around the projection 2e and engages the forward end of the valve body 4. The forward side of this internally extending flange 5b is engaged by the head of a screw member 6. The screw member 6 is provided with a short shank portion which is externally threaded and which engages corresponding threads formed in the portion of the bore 2p at the forward side of the partition 2h therein, as shown best in Fig. 2. The screw member 6 is provided with a polygonally-shaped socket 6a extending therein from its forward side for receiving a suitable tool. The screw 6 presses the bulbular portion 5a of the valve housing against the forward end of the valve body 4, causing the other end of the valve body to engage the shoulder 2f, so that the valve body forms a fluid tight joint between the shoulder 2f and the forward side of the chamber 5b, whereby water can only pass out through the holes 4c registering with the openings 2k. The bulbular portion 5a is provided with two hollow extended portions 5f, which extend preferably ninety degrees to each other and at forty-five degrees to the perpendicular. Each of these extended portions 5f are internally threaded for receiving the threaded portion 7a of their respective valves 7. The threaded portion 7a is at the lower end portion of each valve. The lower end surface of each valve forms the valve face 7b, as indicated in Fig. 6. Extending outwardly through each projection 5f from the threaded portion 7a of the valve therein is the valve stem 7c.

A stuffing box 8 is provided for each valve 7. Each stuffing box 8 is equipped with an internally threaded portion 8a adapted to fit on external threads formed at the extended end of the corresponding projection 5f, and a reduced portion 8b adapted to fit snugly around the stem 7c of its corresponding valve. The outer surface of the enlarged or internally threaded portion 8a is made substantially semi-spherical, while the outer surface of the constricted portion 8b is made substantially cylindrical with flat sides 8c adapted to be engaged by a suitable tool. Suitable packing 8d is forced between the stuffing box 8 and stem 7c. A washer 8e prevents the packing from interfering with the action of the threaded portion 7a of the valve. The extended end of the valve stem 7c is provided with an internally threaded socket 7d. An externally threaded arm 10a projects from a valve handle 10 and is adapted to screw into the socket 7d of the valve. A coupling nut 9 screws onto the arm 10a and is adapted to extend over the outer end of the valve stem 7 so as to cover the juncture thereof with the arm 7a. The valve handle is preferably stamped from suitable metal, forming four oppositely extending arms hollow on their under sides, as shown best in Figs. 1, 2, 6 and 11. The arm 10a is secured to the handle 10 at the juncture of these arms 10b with each other. The outer surfaces of the handles 10 are preferably coated with an enamel or porcelain composition 10c similar to that which is used to cover sinks, bathtubs and the like.

The bulbular portion 5a is provided with a third extension 5g, which projects downwardly and is provided with a hollow opening therethrough communicating with the chamber 5b. The opening within the projection 5g is internally threaded for receiving the end of a spindle 11, as shown best in Figs. 2 and 6. The spindle 11 is provided with a socket 11a extending downwardly from its upper side almost to the lower end thereof, as shown in Fig. 2. The lower end of the spindle 11 is enlarged forming a shoulder 11b. Extending into the lower end of the spindle 11 is a polygonally-shaped socket 11c adapted to receive a suitable tool. The sockets 11a and 11c of course do not intersect.

Supported on gaskets 13 between the shoulder 11c and the shoulder 5h constituting the lower face of extension 5g, is a sleeve portion 12a of the supporting arm 12. The sleeve portion 12a is provided with an enlarged annular portion 12b intermediate its ends which forms a chamber around the spindle 11. The spindle 11 is provided with a plurality of orifices 11d, which communicate between the socket 11a and the chamber 12b.

Extending laterally from the chamber 12b is the arm portion 12c of the spout supporting arm 12. The arm portion 12c is provided with a bore 12d therethrough. A spout 14 is slidably mounted in the bore 12d. The inner end 14a of the spout 14 is slightly enlarged in diameter so as to fit snugly within the bore 12c as shown best in Fig. 2. A stuffing box 15 forms the other support for the spout and supporting arm. The stuffing box is provided with a packing 15b and a corrugated external surface 15a so that it may be tightened by hand and enable any leak to be stopped as soon as it begins.

A shoulder 14b formed by the enlarged inner end portion 14a of the spout forms a stop for limiting the outward movement thereof. The outer end of the spout 14 is curved so as to discharge the water at an angle to the axis of the arm at 12c. The spout can be shifted longitudinally relative to its supporting arm, but may also be twisted relative thereto as indicated by the dotted lines in Fig. 2. The water passes from either coupling member 1 through the conductor 2 to the central portion thereof, out through the corresponding opening 2k between the valve and valve seat connected therewith into the chamber 5b, then down through the socket 11a out the orifices 11d into the chamber 12b, then along the bore 12c and out the spout 14.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a faucet, a conductor member connecting two terminals of a plumbing system and provided with discharge orifices located adjacent to each other intermediate the ends of said conductor, each of said orifices communicating with one of said plumbing terminals, a valve body common to both orifices, said valve body being provided with valve seats of a number in excess of the number of said orifices, said valve body being shiftable so that any pair of said valve seats may register with the said orifices, a valve housing supported by said conductor and enclosing said valve body, valve means mounted on said housing adapted to cooperate with the valve seats which register with said orifices, and a rotatable and extensible spout connected with the said valve housing so as to receive the fluid therefrom.

2. In a faucet, a fluid conductor means, shiftable eccentric coupling means connecting said conductors with two terminals of a plumbing system, said fluid conductor means being adapted to conduct a stream of fluid from each plumbing terminal and bring said streams into adjacent but separate relation to each other, said conductor being provided with a discharge orifice for each stream, a valve body common to both orifices, said valve body being provided with a plurality of valve seats, said valve body being shiftable so that any pair of its valve seats may register with said orifices, a valve housing supported by said conductor and enclosing said valve body, valve means mounted in said housing adapted to cooperate with said valve seats in said valve body, and a spout means connected with said valve housing so as to receive the fluid therefrom.

3. The combination with a faucet adapted to be connected to hot and cold water terminals of a plumbing system and having a pair of valves adjacently located for independently controlling the flow of water, of a valve body common to said valves, said valve body being provided with a plurality of pairs of valve seats, any pair of said valve seats being adapted to be brought into cooperative relation to said valves.

4. In a faucet, a conductor connected with a hot water terminal and a cold water terminal of a plumbing system, said conductor being provided with adjacently located independent orifices, adapted to discharge water from one of said terminals, a valve body common to said orifices supported by said conductor and having a plurality of pairs of holes therethrough each provided with a valve seat, said valve body being shiftable so that any pair of said holes may be brought into register with said orifices, a valve housing adapted to hold said valve body in such relation to said conductor that water can only pass through the said valve holes registering with the said orifices, and valves supported in said valve housing for cooperating with said valve seats.

5. In a faucet, a conductor connected with a hot water and a cold water terminal of a plumbing system, said conductor being provided with adjacently located independent orifices each adapted to discharge water from one of said terminals, a valve body common to said orifices and mounted on said conductor, said valve body being common to said orifices and having a plurality of pairs of valve seats, each surrounding a valve opening, any pair of which seats may be brought into register with said orifices, a valve housing adapted to hold said valve body in such relation to said conductor that water can only pass through said valve openings registering with the said orifices, valves supported in said valve housing for cooperating with said valve seats, and a pivotal and extensible spout adapted to receive water from said valve housing.

6. In a faucet, a conductor, shiftable and eccentric coupling means connected with said conductor for facilitating the connection thereof relative to hot and cold water terminals of a plumbing system, said conductor being provided with adjacently located independent orifices each adapted to discharge water from one of said terminals, a valve body common to said orifices supported by said conductor and having a plurality of pairs of valve openings therethrough, any pair of which may be brought into register with said orifices, means for alining said valve openings with said orifices, a valve housing adapted to hold said valve body in such relation to said conductor that water can only pass through the valve openings registering with said orifices, and valves supported in said valve housing for cooperation with said valve openings.

7. In a faucet, a valve housing, a pair of valves supported therein and a shiftable valve body provided with valve openings, the number thereof being in excess of the number of valves, said valves being adapted to register with any pair of said valve openings.

8. In a faucet, a valve housing, a plurality of angularly related valves supported therein, a valve body provided with a plurality of valve openings, the number thereof being a multiple of said valves and of equal angular relationship, said valves being adapted to cooperate with any equal number of said valve openings, and means connecting each opening registering with said valves with distinct terminals of a plumbing system.

9. In a faucet, a valve housing, angularly related valves supported therein and a valve body provided with a plurality of valve openings, of a number in excess of the number of said valves, said valves being adapted to register with any equal number of said valve openings, and means for alining said valves with said openings.

In testimony whereof, I have hereunto set my hand at San Diego, California, this 11th day of May, 1929.

MARTIN C. BERSTED.